United States Patent [19]

Huwe

[11] 4,131,133

[45] Dec. 26, 1978

[54] ADAPTOR FOR MANUAL LAWN AND GARDEN SPRINKLER VALVES

[76] Inventor: Donald D. Huwe, 17551 Orangetree La., Tustin, Calif. 92680

[21] Appl. No.: 809,793

[22] Filed: Jun. 24, 1977

[51] Int. Cl.² .......................................... F16K 31/48
[52] U.S. Cl. .............................. 137/624.11; 251/292; 251/66
[58] Field of Search .................. 137/624.22, 624.21, 137/624.12, 624.11; 251/292, 66, 291

[56] References Cited

U.S. PATENT DOCUMENTS

| 392,921 | 11/1888 | Howard | 137/624.21 |
| 820,582 | 5/1906 | Laucher | 137/624.11 |
| 900,053 | 9/1908 | Bauer | 137/624.22 |
| 2,545,928 | 3/1951 | Martin | 239/70 X |

FOREIGN PATENT DOCUMENTS 534798 10/1931 Fed. Rep. of Germany ...... 137/624.22

*Primary Examiner*—Alan Cohan
*Attorney, Agent, or Firm*—Harvey C. Nienow

[57] ABSTRACT

An adaptor for manually operable lawn sprinkler control valves for converting such valves to automatic shut-off following a predetermined time interval. It comprises a rotatable shaft whose end portion is bifurcated to effectively grip the manual valve operator. A torsion spring and a rachet wheel or gear are fixed to the shaft, and a timer is provided having an arm for engagement with the rachet wheel. The shaft is manually turned to open the sprinkler valve, such motion storing energy in the spring but the timer arm prevents such energy from closing the valve. After a predetermined interval of time, the arm is moved out of engagement with the wheel and the torsion spring is permitted to return the sprinkler valve to closed condition.

4 Claims, 4 Drawing Figures

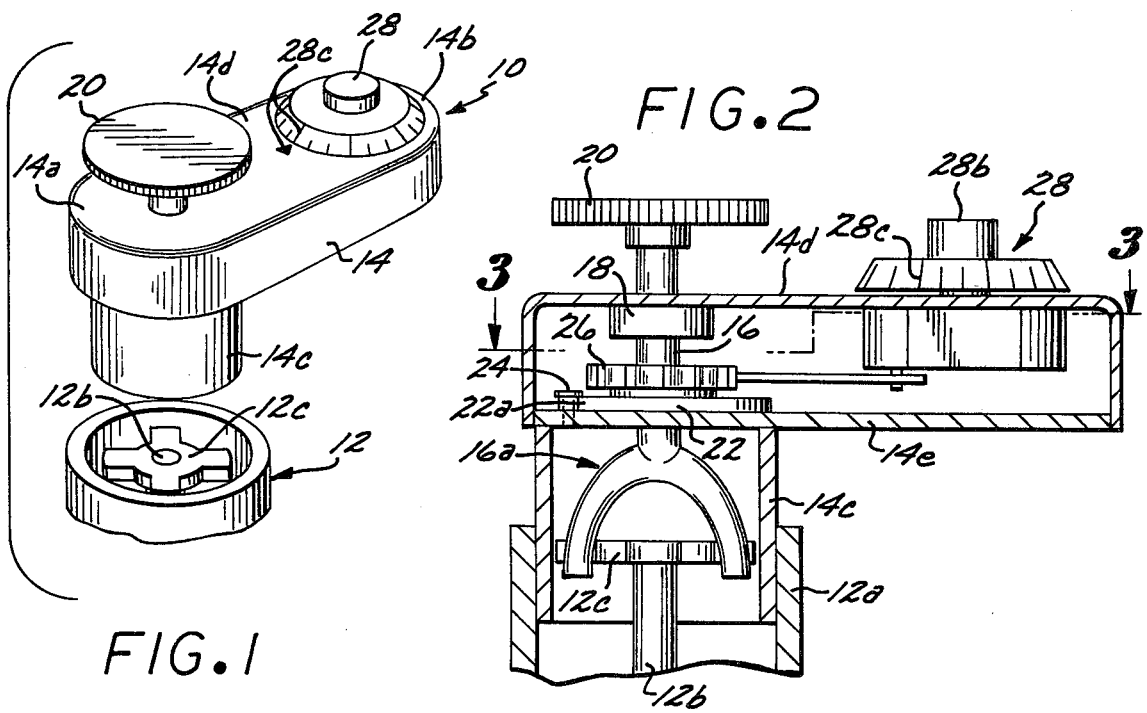
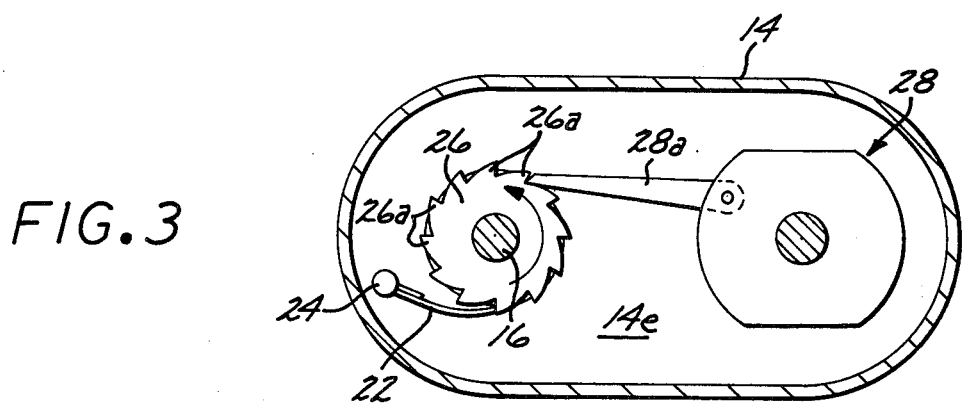
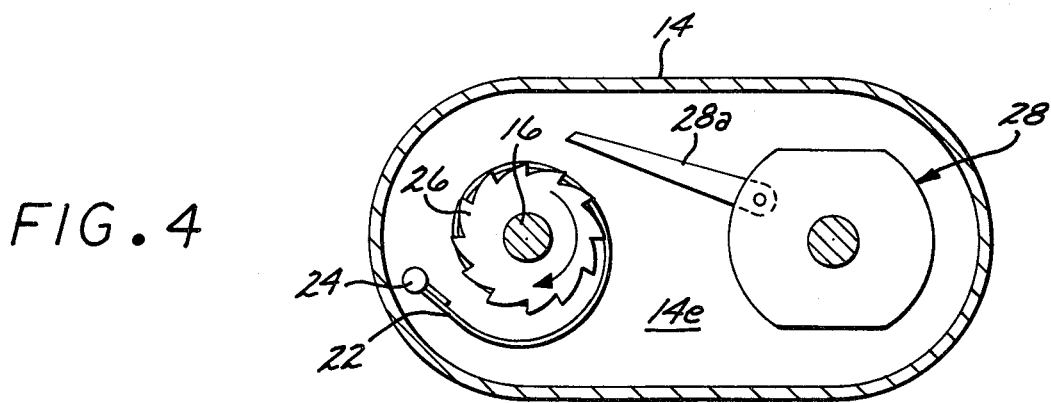

ADAPTOR FOR MANUAL LAWN AND GARDEN SPRINKLER VALVES

SPECIFICATION

The present invention relates generally to adaptors for lawn and garden sprinkler systems but more particularly to an adaptor for sprinkler valves for limiting the period of time such valve remains open.

Today, most lawn and garden areas are supplied water through watering systems which have manually operable valves. Typically, such valves require manual operation to place the watering system in operation, and also require manual operation to interrupt or terminate such operation.

In some of the more arid regions of the United States, such lawn and garden sprinkling systems are permanently installed, and usually have one or more manually operable valves installed in an out-of-the-way place, flush with the ground level.

The fact that natural resources are limited, such that both water and electric power should be conserved, it has become evident that water and energy should not be used promiscuously. Rather, it has been found that a considerable saving in water can be effected merely be insuring that water valves and the like are opened only for the period of time when such water is being used. As this applies to the sprinkling of lawn and garden areas, it has been found that there is an optimum length of time for sprinkling a lawn or garden area under given conditions, and thereafter the water is wasted or, in some instances, detrimental to the condition of the lawn or garden area.

It has been deemed desirable to provide an inexpensive means for timing the sprinkling duration such as to prevent wasting of water.

It is an object of the present invention to provide an adaptor for sprinkler valves which is operable to turn off the water after a predetermined time interval.

A further object of the present invention is to provide an adaptor for sprinkler valves as characterized above which can be quickly and easily attached to existing sprinkler valves and which application does not require any special tools or skills.

Another further object of the present invention is to provide an adaptor for sprinkler valves as characterized above which does not require any energy other than that to be applied manually.

A still further object of the present invention is to provide an adaptor for sprinkler valves as characterized above which automatically turns the valve to its flow-preventing position following any preselected interval of time following commencement of the sprinkling operation.

An even further object of the present invention is to provide an adaptor for sprinkler valves as characterized above which is simple and inexpensive to manufacture and which is rugged and dependable in operation.

The novel features which I consider characteristic of my invention are set forth with particularity in the appended claims.

The invention itself, however, both as to its organization and mode of operation, together with additional objects and advantages thereof, will best be understood from the following description of specific embodiments when read in connection with the accompanying drawings, in which:

FIG. 1 is a perspective view of an adaptor according to the present invention for installation on a sprinkler valve;

FIG. 2 is a longitudinal cross-sectional view of the adaptor of FIG. 1;

FIG. 3 is a sectional view taken substantially along line 3—3 of FIG. 2, showing parts of the adaptor in valve open position; and FIG. 4 is a view similar to FIG. 3 showing the parts in valve closed position.

Like reference characters indicate corresponding parts throughout the several views of the drawings.

Referring to FIG. 1 of the drawings, there is shown therein an adaptor 10 according to the present invention to be installed on or attached to a lawn sprinkling valve, only a portion of which is shown at 12.

Adaptor 10 comprises a housing 14 having arcuately shaped opposite end portions 14a and 14b and which is provided with a generally tubular shaped extension 14c.

As shown most particularly in FIG. 2 of the drawings, the housing 14 has top and bottom walls 14d and 14e, the tubular extension 14c being secured to the bottom wall or formed integrally therewith depending upon the method of manufacture. Such extension fits within the usual tubular portion 12a of the housing of valve 12. A valve stem 12b having an irregularly shaped operating member 12c is shown for operating the valve between flow-permitting and flow-preventing positions. Typically, the operator and stem are rotated manually with a handle which engages the irregular operating member 12c. This is due to the fact that the valve is frequently placed in a relatively obscure location so as not to interfere with the asthetics of the lawn or garden area.

A shaft 16 is rotatably mounted in housing 14, suitable bearings 18 being secured to the top wall 14d around the shaft. Shaft 16 has a lower end portion 16a which extends within the extension 14c and is bifurcated for engagement, as shown in FIG. 2, with the operating member 12c of the sprinkler valve.

The upper end portion of shaft 16 carries a handle 20 which, as will hereinafter become more apparent, is operable to open the sprinkler valve to which the adaptor 10 is attached.

As shown in FIGS. 2, 3 and 4, interposed between shaft 16 and the lower wall 14e of housing 14, is a torsion spring 22, one end thereof being secured to the housing 14 by means of an anchoring pin 24 and another end (not shown) of which is firmly secured to shaft 16. As will hereinafter become more apparent, the torsion spring 22 is attached to shaft 16 in such a direction that energy stored therein tends to rotate the stem 12b of the sprinkler valve to closed position.

Also firmly secured to shaft 16 is a rachet gear or wheel 26 having teeth 26a.

A timer 28 is mounted on the upper wall 14d of housing 14, and has an arm 28a for engagement with teeth 26a of rachet wheel 26. The teeth are so shaped as to be engageable by arm 28a so as to prevent rachet wheel 26 from rotating clockwise as viewed in FIG. 3 of the drawings, but which will not interfere with counterclockwise rotation thereof.

The timer 28 further includes an adjustment or setting knob 28b which is operable to adjust or set the predetermined time interval before arm 28a is moved out of engagement with rachet wheel 26 as will hereinafter become more apparent. Suitable graduations or other indicia 28c are provided on knob 28b as well as the upper surface of housing 14 as shown in FIG. 1 to enable the proper time interval to be selected.

In use, the adaptor 10 is mounted on the sprinkler valve merely by inserting the extension 14c into the tubular portion 12a of the valve. Suitable set screws or the like may be desirable, but it is contemplated that a firm fit of the extension 14c within the housing of the valve is sufficient. The bifurcated lower end portion 16a of shaft 16 is caused to engage the operating member 12c as shown in FIG. 2 of the drawings.

Thereafter, whenever it is desired to operate the sprinkler system, it is merely necessary to, firstly, set the desired time interval into the timer 28 and thereafter to open the valve by manual manipulation of the handle 20. The timer knob 28b is turned until the appropriate marking on such knob coincides with the mark on housing 14 as shown most particularly in FIG. 1. Thereafter, the handle 20 is rotated counterclockwise as viewed in FIG. 3. This opens the valve to provide the sprinkling function. Such rotation of shaft 16 also stores energy in the spring 22.

As will be readily understood by those persons skilled in the art, the arm 28a engaging a tooth 26a of rachet wheel 26, prevents the torsion spring 22 from returning the shaft 16 to its original or valve closed position. When the preselected time interval has elapsed, however, the arm 28a is moved out of engagement with the teeth of wheel 26 enabling torsion spring 22 to immediately rotate shaft 16 in a clockwise direction as viewed in FIG. 4. This causes valve stem 12b to be rotated such as to close the sprinkler valve thus terminating the sprinkling operation.

When it is desired to again provide the sprinkling function, setting of the timer 28 to any appropriate time interval, returns the arm 28a into engagement with the rachet wheel 26 for subsequent retention of the shaft 16 in valve open position against the force of torsion spring 22.

It is thus seen that the present invention provides an adaptor for lawn and garden sprinkler valves to limit them to operation for only a predetermined interval of time.

Although I have shown and described certain specific embodiments of my invention, I am well aware that many modifications thereof are possible. The invention is not to be restricted except insofar as is necessitated by the prior art and by the spirit of the appended claims.

I claim:

1. Adaptor for manual lawn and garden sprinkler valves comprising in combination, a housing formed with a cylindrical extension adapted to have a sliding fit with a sprinkler valve to thereby be the sole support for said housing on said valve, said sliding fit enabling said adaptor to be easily transferred from one sprinkler valve to another, a manually rotatable shaft in said housing engageable with manual valve operating means on said sprinkler valve, torsion spring means on said shaft such that rotation of said shaft to open said valve causes energy to be stored in said spring tending to rotate said shaft to closed position, and a timer in said housing having an arm engageable with said shaft to prevent rotation thereof by said spring until a predetermined time interval has elapsed.

2. Adaptor for manual lawn and garden sprinkler valves according to claim 1, wherein a rachet wheel is provided on said shaft for engagement by said arm of said timer, and manual setting means is provided on said timer for setting said predetermined time interval.

3. Adaptor for manual lawn and garden sprinkler valves according to claim 2, wherein said shaft has a portion in said cylindrical extension of said housing engageable with valve operating means on said sprinkler valve.

4. Adaptor for manual lawn and garden sprinkler valves according to claim 3, wherein said shaft portion is bifuracated for straddling and engaging said sprinlker valve operating means.

* * * * *